July 4, 1944.   M. ESSL   2,352,824
INTERNAL COMBUSTION ENGINE
Filed June 12, 1943   2 Sheets-Sheet 1
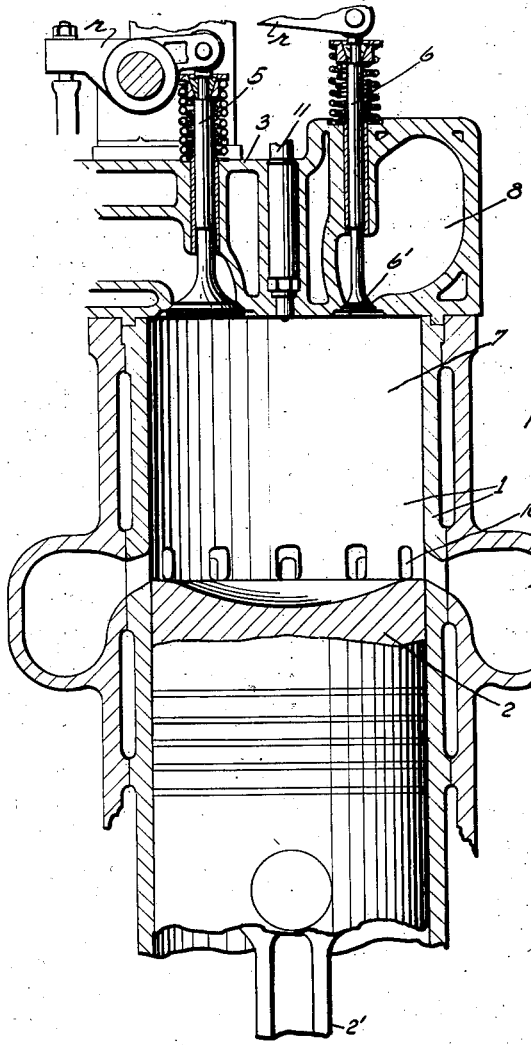
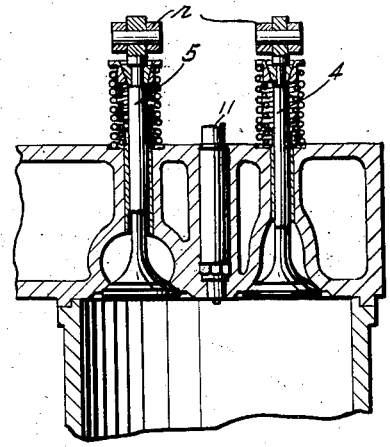
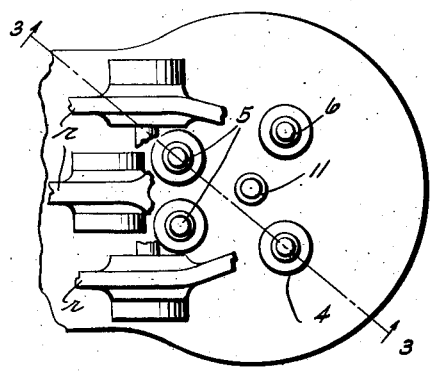
INVENTOR
Max Essl
BY
ATTORNEY July 4, 1944. M. ESSL 2,352,824
INTERNAL COMBUSTION ENGINE
Filed June 12, 1943 2 Sheets-Sheet 2
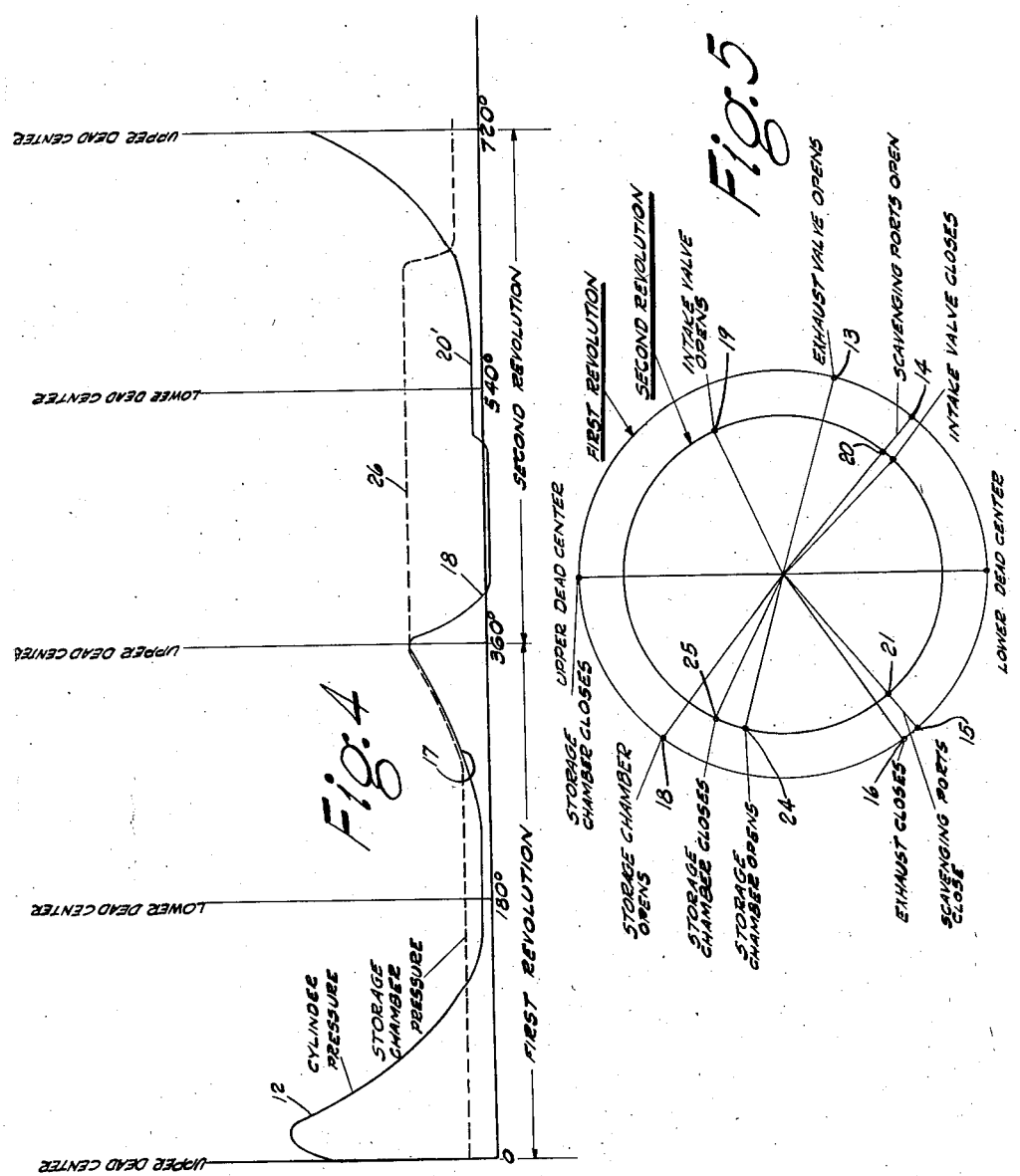
INVENTOR
Max Essl
BY
ATTORNEY Patented July 4, 1944

2,352,824

UNITED STATES PATENT OFFICE 2,352,824

INTERNAL-COMBUSTION ENGINE

Max Essl, Swarthmore, Pa., assignor to The Baldwin Locomotive Works, a corporation of Pennsylvania Application June 12, 1943, Serial No. 490,688

5 Claims. (Cl. 123—76)

This invention relates generally to internal combustion engines such for example as Diesel engines and more particularly to supercharged engines.

Supercharging is usually obtained by employing a pump or blower developing relatively high pressure adapted to directly increase the cylinder pressure during opening of the intake valve of a four cycle engine. However, such superchargers require an appreciable amount of power for their operation thereby reducing the net increase of power. On the other hand, in two cycle engines it is necessary to employ scavenging fluid which is generally at a relatively low pressure and is not supercharging in its proper sense.

It is an object of my invention to provide a four-stroke engine having an improved cycle of operations whereby a supercharging effect may be obtained at a minimum cost in power thereby leaving a higher net power than was heretofore possible.

Another object is to provide a four-stroke engine having an improved cycle of operations whereby a maximum cooling effect of the pistons, cylinders and cylinder heads may be obtained and at the same time the inertia effects may be reduced to allow a relatively high load to be carried by the bearings of the connecting rods or other parts.

In accomplishing the foregoing and other objects such as will be apparent to those skilled in the art from the disclosure herein, I employ an engine working basically on a four-stroke cycle principle but modified with certain two cycle engine principles by providing first, ports at the lower end of the cylinder which when uncovered by the piston on its down stroke will admit scavenging air at slightly above atmospheric pressure to act in pushing the column of exhaust gas from the cylinder through the exhaust valve at the top of the cylinder thus assuring complete discharge of gases; second, compressing the fresh air during the second or upward stroke and storing this air for later supercharging use in a suitable valved storage chamber; third, on the third stroke (downward) fresh air is admitted through a usual air intake valve in the same manner as in a normal four cycle engine thus cooling the piston and cylinder and not requiring any compressing or supercharging means for the air to fill the cylinder; fourth, at the end of the intake stroke the lower cylinder ports are uncovered to again admit air to the cylinder at slightly above atmospheric pressure thus adding to the normal aspiration which usually results in below atmospheric pressure in the cylinder and assuring a full charge of fresh air therein; and fifth, during the fourth or last upward stroke air in the cylinder is compressed and the previously stored air is admitted to the cylinder thus increasing the weight of air to produce a supercharging effect preparatory to the combustion and expansion. The cylinder at this time is fully charged with superweighted air free from exhaust and with a cooler piston, etc. than would be possible in a two cycle engine and yet the normally idle exhaust stroke of a four cycle engine has been converted into a useful stroke for producing an air pressure and volume (weight) that is later used for supercharging. Hence, in effect, five cycles are produced in four strokes.

Other objects and advantages will be more apparent to those skilled in the art from the following description of the accompanying drawings in which:

Fig. 1 is a diagrammatic sectional view of a cylinder and piston and associated elements of an engine embodying my invention;

Fig. 2 is a plan view of Fig. 1;

Fig. 3 is a section taken substantially on the line 3—3 of Fig. 2;

Fig. 4 is a diagrammatic engine cylinder diagram for two crankshaft revolutions constituting a complete cycle of operation; and Fig. 5 is a valve timing diagram.

The particular embodiment of the invention disclosed herein comprises an engine cylinder 1 and a piston 2 reciprocated in a usual manner by a connecting rod 2' and a crankshaft (not shown) which in the position shown in Fig. 1 would be at its bottom dead center position. Any number of cylinders may be employed for a given engine, the principle of operation being the same as for the single cylinder herein discussed. A cylinder head 3 is provided with an air intake valve 4, Figs. 2 and 3, and exhaust valve or valves 5, Figs. 1 and 2. A supercharge air storage chamber 8 of suitable configuration and volumetric capacity is formed in the cylinder head and communicates with the cylinder space 7 through a port 6' controlled by a valve 6. A cylinder scavenging chamber 9 partially or fully encircles the cylinder wall and scavenging ports 10 are arranged at the lower end of the cylinder. A fuel injector 11 is located preferably in the center of the cylinder for injecting fuel spray or sprays into the cylinder under relatively high pressure in a manner well-known in the Diesel engine art.

It will be understood that all valves mentioned herein as well as the injection of fuel are controlled by suitable cams and usual valve rocker arms r, the cams being formed on and rotatably driven by a usual camshaft (not shown) in desired timed relation to each other and the piston movements to produce my improved cycle of operation. Cams are too well known in the art to require a specific disclosure thereof although broadly such cams may be considered to be diagrammatically illustrated herein by the diagram of Fig. 5.

The operation is best understood by referring to Figs. 4 and 5 in which Fig. 4 is a complete working cycle during two revolutions. Beginning at the upper dead center of compression shown in the diagram as 0 degrees a line 12 represents the well-known combustion and expansion line. When the piston reaches position 13, Fig. 5, the exhaust valve or valves 5 open and exhaust gases expand into a manifold (not shown). As the piston continues to move toward its lower dead center the scavenging ports 10 will commence to be uncovered at 14 so as to admit to the cylinder a relatively low pressure scavenging air supplied from any suitable and well-known source thereby to help expel the exhaust gases from the cylinder space 7, Fig. 1, through the exhaust valves 5. The scavenging ports continue to remain open until the piston has moved past its lower dead center and up to a point 15, Fig. 5. When the piston reaches point 16 on its upward travel the exhaust valves 5 close, at which time the cylinder pressure starts to rise along the line 17 in the pressure diagram. The scavenging air sweeps the exhaust gases from the cylinder and fills it with fresh air under a pressure slightly above atmospheric pressure by the time the exhaust valve 5 closes. So far, this portion of the cycle corresponds closely to a uni-flow scavenged two cycle engine in that the scavenging air enters the lower end of the cylinder and sweeps the exhaust gases outwardly through the exhaust valves 5 without involving any reverse flow of scavenging air within the cylinder.

The new cycle now begins as follows: The piston is traveling upwardly (from 180 to 360°) and compresses the charge of air trapped in the cylinder. When point 18, Fig. 5 is reached the valve 6 of the storage chamber opens to allow a portion of the compressed air from the cylinder 7 to enter chamber 8. At or near top dead center (360°), Fig. 5, the storage chamber valve 6 closes to trap compressed air in the chamber. The compression of air during the foregoing upstroke corresponds to the compression stroke of a normal two cycle engine but the compressed air in my engine is stored in chamber 8 whereas said compressed air in a two cycle engine is immediately used on the following power stroke. The compression pressure in my engine at the upper dead center (360°) will not be as high as it normally would be in an engine without a storage chamber because the storage chamber volume added to the cylinder clearance volume proportionately limits the pressure. After the storage chamber valve 6 is closed a relatively small amount of compressed air remains in cylinder 7. This limited volume of air expands as the piston moves down on its second revolution until point 19 is reached whereupon intake valve 4 opens to admit atmospheric air to the cylinder, this stroke corresponding to the intake stroke of a normal four cycle engine. This portion of the cycle is shown in Fig. 4 along line 18 until the piston reaches point 20, Fig. 5, at which time the scavenging ports 10 are again uncovered whereupon scavenging air under relatively low pressure is admitted to the cylinder to fill the same until point 21 is reached, it being understood that intake valve 4 is closed just after scavenging ports 10 opened at 20. The pressure line along which scavenging air is admitted is represented in the diagram, Fig. 4, at 20'. As the piston continues its upward stroke after closure of the scavenging ports at 21 storage air chamber valve 6 now opens at point 24, Fig. 5, and closes again at 25. During this relatively short opening of the chamber valve 6, although it can be of longer opening if desired insofar as it is possible to adhere to the principles of operation of my invention, air from the chamber is added to the cylinder volume. The storage chamber valve is most efficiently timed if opened at a pressure in the cylinder which will result in the lowest amount of re-expansion of the stored air and will close at a point before any appreciable amount of air is recharged into the storage chamber. Fuel is injected through nozzle 11 at any usual or desired time between point 25 and the upper dead center. The remainder of the compression stroke from point 25 on up to the upper dead center will be normal and, of course, by reason of the air made available from the storage chamber the weight of air in the cylinder has been appreciably increased above what would be present in a normal two or four cycle engine. Combustion will continue the engine on its next cycle which is a repetition of the cycle heretofore described. The pressure in the storage chamber throughout the complete cycle is indicated by the dotted line 26, Fig. 4.

The above mentioned increased weight of air gives a supercharged effect without the necessity of employing a supercharger. Such superchargers require appreciable power for their operation and thus reduce the net power produced whereas my improved method and apparatus not only produces a high supercharged effect per unit of required operating power but I accomplish this through a minimum number of working parts which have relatively low maintenance cost and do not increase the space dimensions of the engine. The supercharging air of my improved cycle is obtained by utilizing the engine pistons as the air compressing mechanism, thus eliminating engine driven supercharging pistons such as sometimes form an auxiliary part of an engine structure, as well as avoiding the use of other forms of well-known superchargers, it being understood that the scavenging pump in my operation does not constitute a supercharger in the correct sense of that term.

Furthermore, my improved cycle not only cools the piston and cylinder by the atmospheric air on the normal intake stroke but the scavenging air provides an additional cooling effect. Moreover, I produce the positive cooling effect without wasting the exhaust stroke such as would be the case with a four cycle engine, this stroke being utilized in my engine to compress the air for the storage chamber.

A further result of my improved cycle is that the foregoing cooling effect is accompanied by an increased weight of air in the cylinder for the explosion stroke and also by a reduced inertia load on the wristpin and connecting rod bearings and on the connecting rod bolts. The inertia force occurs during the last half of the upstroke when the parts in question are decelerating. The reduction of inertia load on the bearings and bolts is brought about in my arrangement by the pressure of the compression stroke 17, Fig. 4, resisting or tending to balance said inertia effects, it being understood that in a usual four cycle engine during the exhaust stroke the cylinder is subjected only to an exhaust pressure which is so low that it has the disadvantage of not offering any appreciable resisting force to the upward movement of the piston and connecting rod while on the other hand in a two cycle engine the compression pressure which resists the inertia effects is so great as to reduce the load carrying capacity of the bearings. The ability of my cycle to increase the load carrying capacity of the connecting rod and wristpin bearings will be more fully appreciated by first understanding that in two cycle engines a downward load is substantially continuously imposed on the wristpin and connecting rod bearings by reason of each compression and expansion stroke being immediately followed by another compression and expansion stroke without any intermediate relief stroke such as an exhaust stroke in a four cycle engine. This downward load being in the nature of a continuous load, does not allow an oil film to be easily maintained as compared, for example, in a four cycle engine in which the exhaust stroke follows the expansion stroke and acts as a "relief" stroke in which the piston tends to fly upward through its inertia effect thereby relieving the bearing pressure on the loaded side of the bearings, i. e. the upper half of the connecting rod bearing and the lower half of the wristpin bearing. These relieved pressures permit a new film of lubricant to be established on said upper and lower sides of the bearings. The ability to supply a new film of lubricant is a distinct advantage in a four cycle engine not only because of providing an adequate film of lubricant but also because of the effect of the lubricant in cooling the bearings. In fact, on the basis of experience, it has been found that two cycle engine bearings can be loaded approximately to only one half the specific bearing pressures of four cycle engines. Hence, in my improved cycle, I utilize stroke 17 for a compression operation similar to that of a two cycle engine but I do not obtain the disadvantages of the bearing loads of such a two cycle engine because the compression during this stroke is substantially less than a full compression pressure thereby permitting ample lubrication to be maintained by repeated re-establishment of an oil film on the loaded side of the bearings when partial relief of pressure occurs during the combined scavenging-storage stroke.

From the disclosure herein, it is seen that I have provided an improved engine having, in effect, five cycles in four strokes of the pistons whereby the engine pistons function as a supercharge air compressing element. This operation, in combination with the scavenging and normal air intake stroke, insures maximum cooling of the piston, etc. together with minimum inertia effects of the piston and connecting rod while at the same time insuring effective lubrication of the engine bearings so that they may carry a high load. The relatively low power required to operate the scavenging pump at its nominally low pressure of say possible 3 or 4 pounds compared to the ultimate effective supercharged pressure insures a relatively large increase in net horsepower.

It will of course be understood that various changes in details of construction and arrangement of parts may be made by those skilled in the art without departing from the spirit of the invention as set forth in the appended claims.

I claim:

1. An internal combustion engine comprising, in combination, a cylinder and a piston movable up and down therein, an exhaust valve at the upper end of the cylinder and scavenging ports at the lower end thereof, means whereby at the end of a combustion stroke the exhaust valve and scavenging ports are both opened so as to admit scavenging air to the lower end of the cylinder to sweep exhaust gases out of the upper end of the cylinder through the exhaust valve and thereafter said exhaust valve and scavenging ports are closed, a storage chamber and a valve for controlling communication between the chamber and the upper end of the cylinder, means whereby after said closure of the exhaust valve and of the scavenging ports said storage valve is opened on the succeeding up-stroke of the piston so that air compressed by the piston is forced into said storage chamber and is trapped therein under pressure upon closure of the storage valve, an air intake valve at the upper end of the cylinder adapted to be opened during the next down stroke of the piston to again fill the cylinder with air and thereafter said intake valve is closed so that the succeeding up-stroke of the piston compresses the air in the cylinder, said storage chamber valve being opened during said latter compression stroke to admit stored air from the storage chamber to the cylinder to produce supercharging, and means for supplying fuel to the supercharged cylinder for producing the next combustion stroke.

2. The combination set forth in claim 1 further characterized in that said scavenging ports are opened and closed by the piston whereby said intake valve and said scavenging ports are both open at the lower end of the intake stroke so that scavenging air is admitted to the cylinder to be added to the air admitted through the intake valve.

3. An internal combustion engine comprising, in combination, a cylinder and a piston movable up and down therein, means near the lower end of the combustion stroke of the piston for supplying scavenging air to the lower end of the cylinder, an exhaust valve at the upper end of the cylinder through which exhaust gases are expelled by the scavenging air while the piston is still near said lower end whereby upon closure of said scavenging air supply means and of said exhaust valve the scavenging air is compressed on the following up-stroke of the piston, a storage chamber having valve controlled communication with said cylinder to receive and store the compressed air from the cylinder during said latter up-stroke, an intake valve through which air is supplied to the cylinder during the succeeding down stroke of the piston to be compressed on the following up-stroke of the piston, means whereby during this later up-stroke the air from the storage chamber is admitted to the cylinder to produce supercharging effect therein, and means for supplying fuel to the supercharged cylinder for effecting the next combustion stroke.

4. An internal combustion engine comprising, in combination, a cylinder and a piston movable up and down therein, means near the lower end of the combustion stroke of the piston for supplying scavenging air to the lower end of the cylinder, an exhaust valve at the upper end of the cylinder through which exhaust gases are expelled by the scavenging air while the piston is still near its lower end whereby upon closure of said scavenging air supply means and of said exhaust valve the scavenging air remaining in the cylinder is compressed on the following up-stroke of the piston constituting a first compression stroke, an intake valve through which air is supplied to the cylinder during the succeeding down stroke of the piston and which latter air is compressed on the following up-stroke of the piston constituting a second compression stroke, means whereby during this second compression stroke the air from the storage chamber is admitted to the cylinder while the cylinder pressure is less than that of the storage chamber thereby to increase the weight of air within the cylinder to supercharge the same, said storage valve being reclosed sufficiently before the end of the up-stroke so as to prevent re-storing of air in the storage chamber, and means for supplying fuel to the supercharged cylinder for effecting the next combustion stroke.

5. The method of operating a four-stroke internal combustion engine having a cylinder and a piston movable up and down therein, intake and exhaust valves at the upper end of the cylinder, a valve controlled storage chamber adapted to communicate with the upper end of the cylinder and scavenging ports near the lower end of the cylinder; consisting in admitting scavenging air to the lower end of the cylinder near the end of the combustion stroke and expelling exhaust gases through the exhaust valve, then closing said scavenging ports and exhaust valve and compressing the scavenging air remaining in the cylinder and storing the compressed air in the storage chamber, then admitting air into the cylinder through the intake valve on the succeeding down stroke, compressing this latter air on the next up-stroke of the piston and admitting air from the storage chamber into the cylinder at such a point on this up-stroke that pressure in the cylinder permits effective supercharging by the stored air.

MAX ESSL.